(12) United States Patent
Li et al.

(10) Patent No.: US 8,356,289 B2
(45) Date of Patent: Jan. 15, 2013

(54) EFFICIENT ENCODING OF INSTRUMENTED DATA IN REAL-TIME CONCURRENT SYSTEMS

(75) Inventors: Juan Jenny Li, Basking Ridge, NJ (US); David Mandel Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1001 days.

(21) Appl. No.: 12/240,868

(22) Filed: Sep. 29, 2008

(65) Prior Publication Data

US 2009/0249308 A1 Oct. 1, 2009

Related U.S. Application Data

(63) Continuation-in-part of application No. 12/056,026, filed on Mar. 26, 2008.

(51) Int. Cl.
*G06F 9/44* (2006.01)
*G06F 9/45* (2006.01)

(52) U.S. Cl. ......... 717/132; 717/144; 717/155; 717/156

(58) Field of Classification Search .................. None
See application file for complete search history.

(56) References Cited

U.S. PATENT DOCUMENTS

| | | | | |
|---|---|---|---|---|
| 7,089,537 B2 * | 8/2006 | Das et al. | ...... | 717/132 |
| 7,185,329 B1 * | 2/2007 | Verbitsky | ...... | 717/156 |
| 7,272,829 B1 * | 9/2007 | Meirowitz | ...... | 717/155 |
| 7,624,382 B2 * | 11/2009 | Chauvel et al. | ...... | 717/132 |
| 7,810,085 B2 * | 10/2010 | Shinnar et al. | ...... | 717/156 |
| 8,166,467 B2 * | 4/2012 | Biswas et al. | ...... | 717/156 |
| 2004/0243982 A1 * | 12/2004 | Robison | ...... | 717/132 |
| 2005/0097533 A1 * | 5/2005 | Chakrabarti et al. | ...... | 717/144 |
| 2005/0108695 A1 * | 5/2005 | Li et al. | ...... | 717/144 |
| 2005/0235265 A1 * | 10/2005 | Allen | ...... | 717/126 |
| 2009/0077542 A1 * | 3/2009 | Chou et al. | ...... | 717/132 |

OTHER PUBLICATIONS

Hill et al., Adapting two-class support vector classification methods to many class problems, Aug. 2005, 8 pages, <http://delivery.acm.org/10.1145/1110000/1102391/p313-hill.pdf>.*
Vural et al., A hierarchical method for multi-class support vector machines, Jul. 2004, 8 pages, <http://delivery.acm.org/10.1145/1020000/1015427/p330-vural.pdf>.*
Karkare et al., An improved bound for call strings based interprocedural analysis of bit vector frameworks, Oct. 2007, 13 pages, <http://delivery.acm.org/10.1145/1290000/1286829/a38-karkare.pdf>.*

\* cited by examiner

*Primary Examiner* — Thuy Dao

(57) ABSTRACT

A mechanism for encoding and reporting instrumented data is disclosed that requires less storage space and incurs less processor overhead than other methods of the prior art. In accordance with the illustrative embodiment, a bit vector in shared memory corresponds to nodes of a program's control-flow graph that have been instrumented, and the contents of the vector indicate which of these nodes have executed; in addition, character strings in shared memory indicate what file, class, and method each node belongs to. A process that executes concurrently with those of the program under test transmits instrumented data from the shared memory to a database. The illustrative embodiment enables efficient, rapid reporting and storage of instrumented data, and is therefore especially well-suited for run-time analysis of real-time concurrent systems.

17 Claims, 6 Drawing Sheets

Figure 1 (PRIOR ART)

PROGRAM 100
(TWO-COLUMN CODE LISTING)

```
Non-branching statementA1;
Non-branching statementA2;
......
Non-branching statementAn;
While Expression1 {
If Expression2 {
    Switch Expression3 {
        Case Expression4:
            Non-branching statementB1;
Non-branching statementB2;
......
Non-branching statementBm;
        Case Expression5:
            Non-branching statementC1;
Non-branching statementC2;
......
Non-branching statementCo;
    }
    If Expression6 {
        Non-branching statementD1;
Non-branching statementD2;
......
Non-branching statementDp;
    } else {
        Non-branching statementE1;
Non-branching statementE2;
......
Non-branching statementEq;
    }
```

```
    else {
        Non-branching statementF1;
Non-branching statementF2;
......
Non-branching statementFr;
    }
Non-branching statementG1;
Non-branching statementG2;
......
Non-branching statementGs;
```

EFFICIENT ENCODING OF INSTRUMENTED DATA IN REAL-TIME CONCURRENT SYSTEMS

CROSS-REFERENCE TO RELATED APPLICATIONS

This application is a continuation-in-part of U.S. patent application Ser. No. 12/056,026, filed 26 Mar. 2008 (now pending), entitled "Super Nested Block Method to Minimize Coverage Testing Overhead", which is incorporated by reference.

FIELD OF THE INVENTION

The present invention relates to run-time analysis of software in general, and, more particularly, to a method of efficiently coding instrumented data in real-time concurrent systems.

BACKGROUND OF THE INVENTION

Instrumentation is a technique that can enable engineers to comprehend, monitor, and assess the operation of software. Typically, a program is instrumented by inserting probes at various points in the program, where the probes report a variety of information, typically by printing to a file. This information, referred to as instrumented data, might include indications of whether certain portions of a program have been reached (referred to as coverage), the number of times that various portions of the program have been executed (referred to as execution counts), how much time is spent in various portions of the program, and so forth. Instrumentation thus facilitates the identification of coverage efficiency, bottlenecks, bugs, and other deficiencies in a program and, consequently, can aid in the process of improving the quality, security, efficiency, and performance of programs.

The introduction of probes into a program, however, adds overhead that can slow down the execution of the program, and thus there is a tradeoff when inserting probes into a program. Ideally, the probes should cover all of the various execution paths of the program, and should be sufficient in number so that the reported information is fine-grained enough to be useful. However, if there are too many probes, then program runtime performance might suffer appreciably, which is unacceptable in applications such as real-time embedded systems and Voice over Internet Protocol (VoIP). Similarly, printing instrumented data to a file can slow execution to a degree that is unacceptable in real-time systems.

Some methods for determining probe insertion points in a program are based on a control-flow graph that is derived from the program. FIG. 1 depicts illustrative program 100, and FIG. 2 depicts control-flow graph 200 corresponding to program 100, both in accordance with the prior art. As shown in FIG. 2, control-flow graph 200 comprises nodes 201-1 through node 201-13, connected by arcs as shown. For convenience, each node of control-flow graph 200 has been assigned a label that indicates the portion of program 100 (known as a basic block) to which it corresponds.

SUMMARY OF THE INVENTION

The present invention provides a mechanism for encoding and reporting instrumented data that requires less storage space and incurs less processor overhead than other methods of the prior art. In accordance with the illustrative embodiment, a bit vector in memory corresponds to nodes of a program's control-flow graph that have been instrumented, and the contents of the vector indicate which of these nodes have executed. In addition, character strings in memory indicate what file, class, and method each node belongs to.

The illustrative embodiment employs a shared-memory architecture that enables these instrumented data to be stored for each of a plurality of concurrently-executing processes of the program under test. A separate, additional process executes concurrently with those of the program and transmits instrumented data from the shared memory to a database. These techniques enable efficient, rapid reporting and storage of instrumented data, and therefore the illustrative embodiment is especially well-suited for run-time analysis of real-time concurrent systems.

In accordance with the illustrative embodiment, an algorithm based on super nested blocks is employed to determine which nodes of a control-flow graph are to be instrumented with probes. The mechanism of reporting and storing instrumented data, however, can be used with any instrumented control-flow graph, regardless of the particular algorithm that might be employed to determine which nodes are instrumented.

The illustrative embodiment comprises: (a) a bit vector comprising N bits, wherein N is a positive integer, and wherein each of the bits: (i) corresponds to a respective node of a control-flow graph of an object-oriented program into which a respective probe has been inserted, and (ii) is a flag that indicates coverage of the respective node during an execution of the object-oriented program; and (b) a character string comprising, for each method of the object-oriented program: (i) the name of the method, (ii) the name of the class to which the method belongs, (iii) the name of the file in which the source code of the class is stored, and (iv) one or more identifiers identifying nodes of the control-flow graph that belong to the method.

BRIEF DESCRIPTION OF THE DRAWINGS

FIG. 1 depicts an outline of illustrative program 100, in accordance with the illustrative embodiment of the present invention.

DETAILED DESCRIPTION

Figure 2:
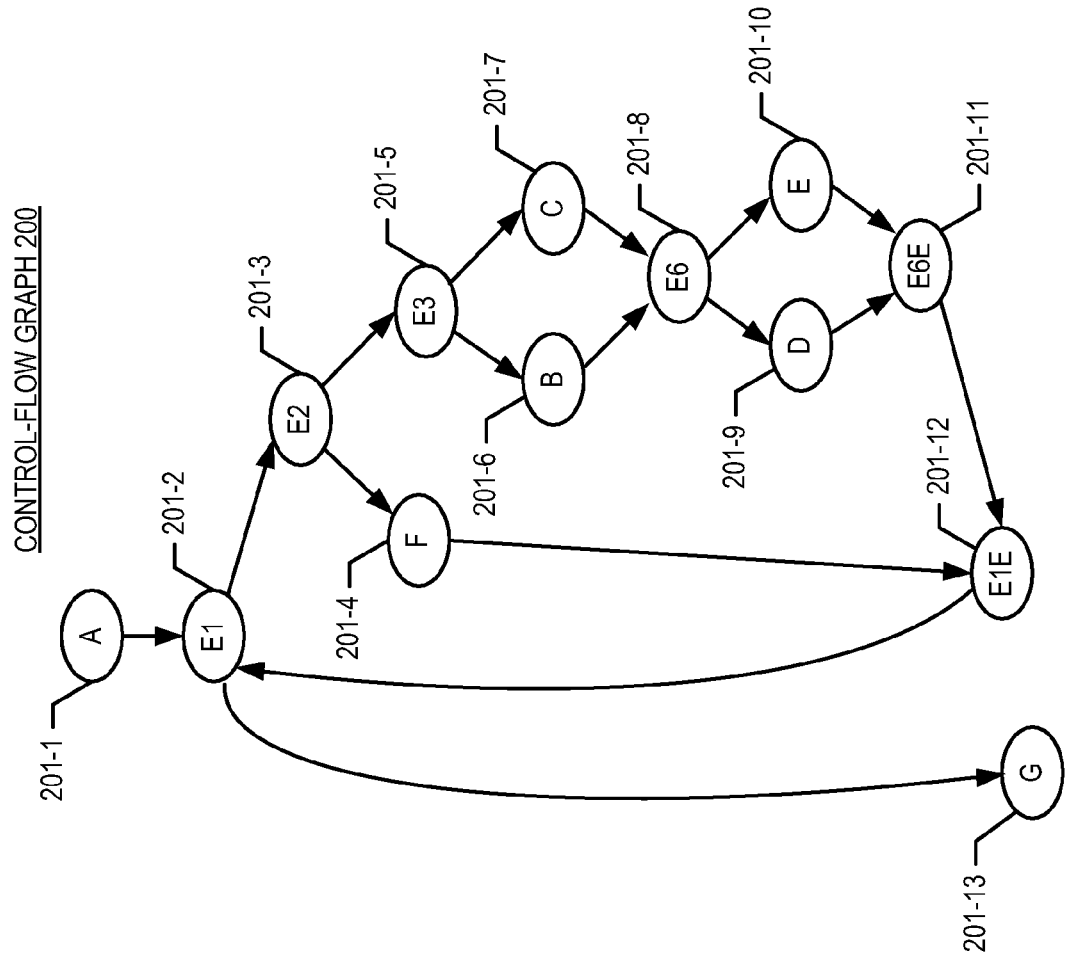
FIG. 2 depicts a control-flow graph corresponding to illustrative program 100, in accordance with the illustrative embodiment of the present invention.

Typically methods for determining probe insertion points in a program are based on a control-flow graph that is derived from the program. FIG. 1 depicts illustrative program 100, and FIG. 2 depicts control-flow graph 200 corresponding to program 100, both in accordance with the prior art. As shown in FIG. 2, control-flow graph 200 comprises nodes 201-1 through node 201-13, connected by arcs as shown. For convenience, each node of control-flow graph 200 has been assigned a label that indicates the portion of program 100 (known as a basic block) to which it corresponds.

Informal Description of the Super Nested Block Method

An informal description of the Super Nested Block Method as applied to illustrative control-flow graph 200 is first provided in this section. A formal specification of the method is subsequently provided in the following section.

In the first task of the method, the first layer of super nested block starting with the root node (i.e., node 201-1 or "A" for control-flow graph 200) is identified. In the case of control-flow graph 200, the first layer of super nested block consists of node 201-1 (A), node 201-2 (E1), node 201-12 (E1E), and node 210-13 (G), which corresponds to the following lines of code:

```
Non-branching statementA1;
Non-branching statementA2;
......
Non-branching statementAn;
While Expression1 {
}
Non-branching statementG1;
Non-branching statementG2;
......
Non-branching statementGs;
}
```

As will be appreciated by those skilled in the art, after reading this specification, the lines of code above constitute a super nested block, because for any two consecutive lines of code X and Y in the block, if X is executed, then Y is also executed at some point after the execution of X, albeit possibly with one or more other lines of code executed in between X and Y. This first super nested block is subsequently referred to as SNB1.

The second task of the method checks whether the current super nested block (at this point, SNB1) has any branching statements. If not (i.e., the super nested block comprises a single node of the control-flow graph, and is thus simply a basic block), the single node is marked "probe-needed". Otherwise, one of the child nodes of the current super nested block is marked as "sum-needed", and each child node, which is the root of a second-layer (or "child") super nested block, is expanded (i.e., processed in accordance with this method). The child super nested blocks, in combination with the current super nested block (at this point, SNB1), is referred to as a super nested block group.

In the case of control-flow graph 200, super nested block SNB1 has a single child node, node 201-3 (E2), and thus at the second task, node 201-3 is marked as "sum-needed," and is then expanded, as described below.

The marking "sum-needed" means that the summation of this super nested block group will be used to calculate the current super nested block's execution counts. (As will be appreciated by those skilled in the art, after reading this disclosure, it can be shown that the execution count of a super nested block is the summation of execution counts of all super nested blocks inside any one of the child super nested block groups.)

Super nested block groups that lack a "sum-needed" mark do not require execution counts for every child super nested block-one of the child super nested block groups does not need an execution count probe. Naturally, if possible, it is advantageous to select the child super nested block with the highest potential execution count as the one that is not marked "sum-needed".

In the case of control-flow graph 200, the second layer of super nested block is the first-layer statements inside the while loop, starting from E2. This second super nested block, SNB2, consists of a single node, node 201-3 (E2), which corresponds to the following lines of code:

```
If Expression2 {
......
}
else {
......
}
```

The second task is then repeated for super nested block SNB2. Because SNB2 includes a branching statement, it is further expanded into a third layer with two super nested blocks. The first third-layer super nested block, SNB31, consists of node 201-5 (E3), node 201-8 (E6), and node 201-11 (E6E) and corresponds to the following lines of code:

```
Switch Expression3 {
...
}
If Expression6 {
...
} else {
...
}
```

Because super nested block SNB31 has more than one branching statement, one of them must be selected to be marked as "sum-needed". Assuming that node 201-8 (E6) is selected, all child nodes of node 201-8 (E6)-namely node 201-9 (D) and node 201-10 (E).

Because node 201-5 (E3) of super nested block SNB31 is not marked "sum-needed", one if its child nodes 201-6 (B) and 201-7 (C) does not need to be processed. Assuming that node 201-7 (C) is chosen to be excluded from processing, node 201-6 (B) is processed by being marked "probe-needed," as it does not have any branching statements (i.e., it is a basic block).

The second third-layer super nested block, SNB32, consists of node 201-4 (F), and corresponds to the following lines of code:

```
Non-branching statementF1;
Non-branching statementF2;
......
Non-branching statementFr;
```

Because super nested block SNB32 does not have any branching statements (i.e., it is a basic block), node 201-4 (F) is marked "probe-needed". The second task is now completed.

In the third and final task, a probe is inserted into the portions of source program 100 that correspond to the nodes marked "probe-needed": node 201-6 (B), node 201-7 (C), node 201-9 (D), node 201-10 (E), and node 201-4 (F).

As will be appreciated by those skilled in the art, the expansion of subsequent layers of the control-flow graph lends itself very well to a recursive implementation, and this is in fact how the method is formally specified in the subsequent section. As will further be appreciated by those skilled in the art, in some other embodiments of the present invention the expansion might be performed in an alternative, non-recursive, fashion (e.g., iteratively via a breadth-first search traversal of the control-flow graph, etc.), and it will be clear to those skilled in the art, after reading this disclosure, how to make and use such alternative embodiments.

Formal Specification of the Super Nested Block Method

Figure 3:
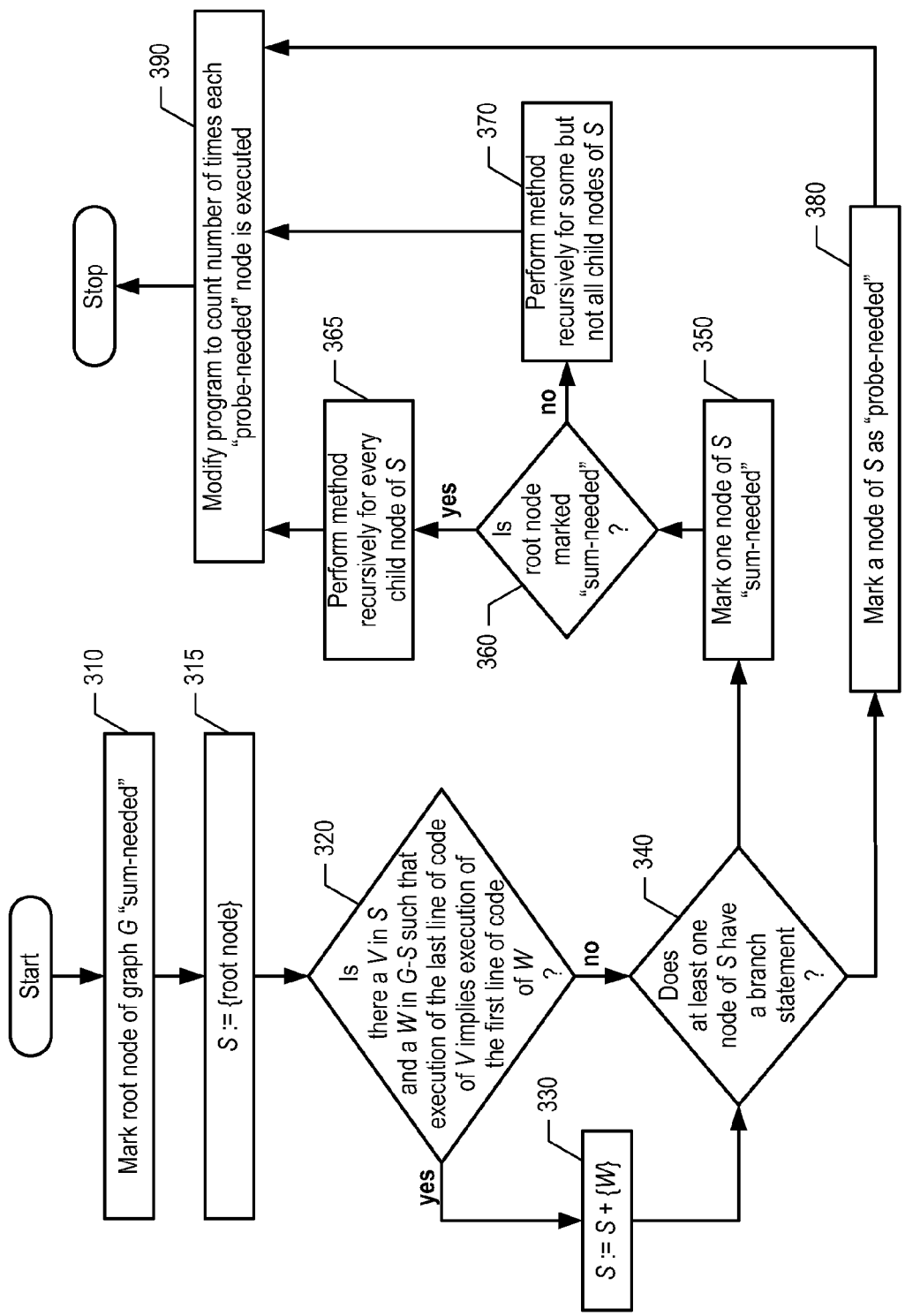
FIG. 3 depicts a flowchart of the Super Nested Block Method, in accordance with the illustrative embodiment of the present invention.

FIG. 3 depicts a flowchart of the salient tasks of the Super Nested Block Method, in accordance with the illustrative embodiment of the present invention. It will be clear to those skilled in the art, after reading this disclosure, which tasks depicted in FIG. 3 can be performed simultaneously or in a different order than that depicted.

At task 310, the root node of control-flow graph G is marked as "sum-needed".

At task 315, variable S is initialized to a singleton set containing the root node.

Task 320 checks whether there is a node V in S and a node W in G-S such that execution of the last line of code of V implies execution of the first line of code of W. If so, execution proceeds to task 330, otherwise execution continues at task 340.

At task 330, node W is added to set S.

Task 340 checks whether at least one node of set S has a branch statement. If so, execution proceeds to task 350, otherwise execution continues at task 330.

At task 350, one node of set S is marked as "sum-needed".

Task 360 checks whether the root node is marked "sum-needed". If so, execution proceeds to task 365, otherwise execution proceeds to task 370.

At task 365, the method is performed recursively for every child node of set S. After task 365, execution continues at task 390.

At task 370, the method is performed recursively for some but not all child nodes of set S. After task 370, execution continues at task 390.

At task 380, one node of set S is marked as "probe-needed".

At task 390, the program corresponding to control-flow graph G is modified to count the number of times that each node marked "probe-needed" is executed. After task 390, the method of FIG. 3 terminates.

Figure 4:
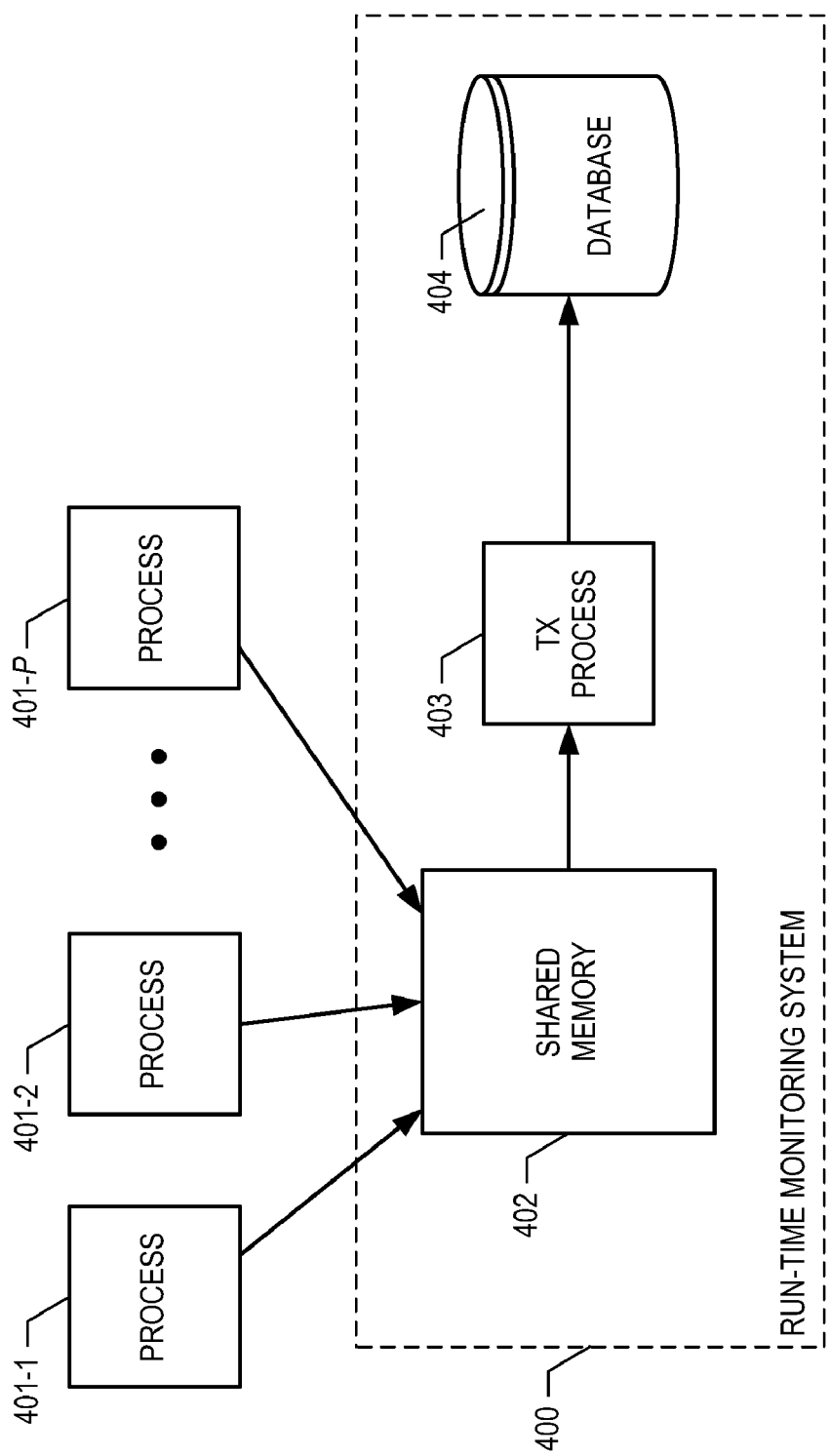
FIG. 4 depicts processes 401-1 through 401-P of an object-oriented program, where P is a positive integer, and the salient elements of run-time monitoring system 400, in accordance with the illustrative embodiment of the present invention.

FIG. 4 depicts processes 401-1 through 401-P of an object-oriented program, where P is a positive integer, and the salient elements of run-time monitoring system 400, in accordance with the illustrative embodiment of the present invention. As depicted in FIG. 4, monitoring system 400 comprises shared memory 402, transmit process 403, and database 404, interconnected as shown.

Shared memory 402 is a memory (e.g., random-access memory, flash memory, etc.) that is capable of storing one or more data structures, and of being written to by processes 401-1 through 401-P, in well-known fashion. In accordance with the illustrative embodiment, shared memory 402 comprises separate buffers for each of processes 401-1 through 401-P, thereby enabling the processes to write to shared memory 402 concurrently. The organization and contents of shared memory 402 is described in detail below and with respect to FIG. 5.

Transmit process 403 is a process that executes concurrently with processes 401-1 through 401-P, and is capable of continually reading the contents of shared memory 402 and transmitting this information to database 404, in well-known fashion. In accordance with the illustrative embodiment, transmit process 403 transmits information to database 404 via a User Datagram Protocol (UDP) connection in order to ensure good performance. It will be clear to those skilled in the art, however, after reading this disclosure, how to make and use alternative embodiments in which transmit process 403 transmits to database 404 via a different type of connection or protocol.

Database 404 is a database that is capable of receiving data from transmit process 403, and of storing and organizing data in a manner that enables efficient retrieval. In accordance with the illustrative embodiment, database 404 is a relational database; however, it will be clear to those skilled in the art, after reading this disclosure, how to make use other embodiments of the present invention in which database 404 is some other type of database (e.g., an object-oriented database, a hierarchical database, etc.).

Figure 5:
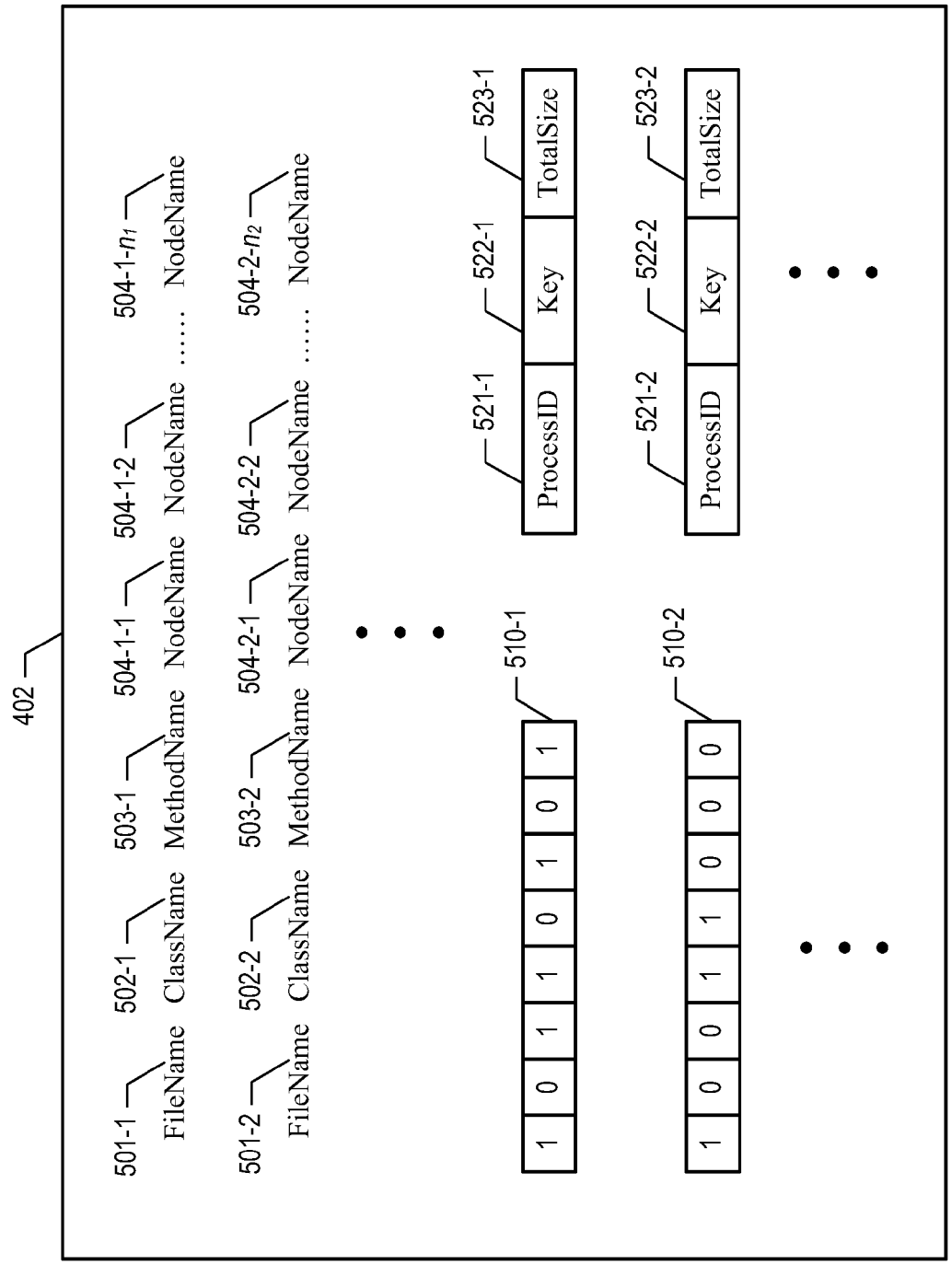
FIG. 5 depicts the salient contents of a data structure stored in shared memory 402, as shown in FIG. 4, in accordance with the illustrative embodiment of the present invention.

FIG. 5 depicts the salient contents of a data structure stored in shared memory 402, in accordance with the illustrative embodiment of the present invention. As shown in FIG. 5, the data structure comprises:

(a) one or more character strings, each of which comprises
  (1) filename 501, which is the name of a source code file of the object-oriented program under test,
  (2) class name 502, which is the name of an object class in the source code file with name 501,
  (3) method name 503, which is the name of a method in the class with name 502, and
  (4) one or more node names 504, which are the names of instrumented nodes in the program's control-flow graph corresponding to the method with name 503;
(b) one or more bit vectors 510 (described in detail below), each of which corresponds to a respective process of the executing object-oriented program under test (e.g., process 401-1, etc.);
(c) one or more process IDs 521, each of which corresponds to a respective process of the executing object-oriented program under test;
(d) one or more keys 522 (described in detail below), each of which corresponds to a respective process of the executing object-oriented program under test; and
(e) the total sizes 523, in bytes, of each respective process' execution trace.

For illustrative purposes, two character strings are depicted in FIG. 5, however there might in fact be fewer or more such character strings, depending on the number of source code files with instrumented nodes. Similarly, for illustrative purposes two bit vectors are depicted in FIG. 5, however there might in fact be fewer or more such bit vectors, depending on the number of processes of the executing program.

Bit vector 510 has N bits, where N is the number of instrumented nodes of the control-flow graph $$\left(\text{i.e., } N = \sum_j n_j\right).$$

The bits of bit vector 510 correspond to the instrumented nodes in the order in which their names appear in shared memory 402. For example, the first bit corresponds to the node with name 504-1-1, the second bit corresponds to the node with name 504-1-2, and so on, with the last bit of the bit vector corresponding to the last node name in the last character string. Each bit is a flag that indicates whether the corresponding node of the control-flow graph has been visited during the execution of the associated process.

In accordance with the illustrative embodiment, key 522 comprises the name of the object-oriented program under test, a username that indicates the user who is executing the object-oriented program under test, and a time stamp. As will be appreciated by those skilled in the art, some other embodiments might employ some other type of key, and it will be clear to those skilled in the art, after reading this disclosure, how to make and use embodiments that employ such alternative keys.

Figure 6:
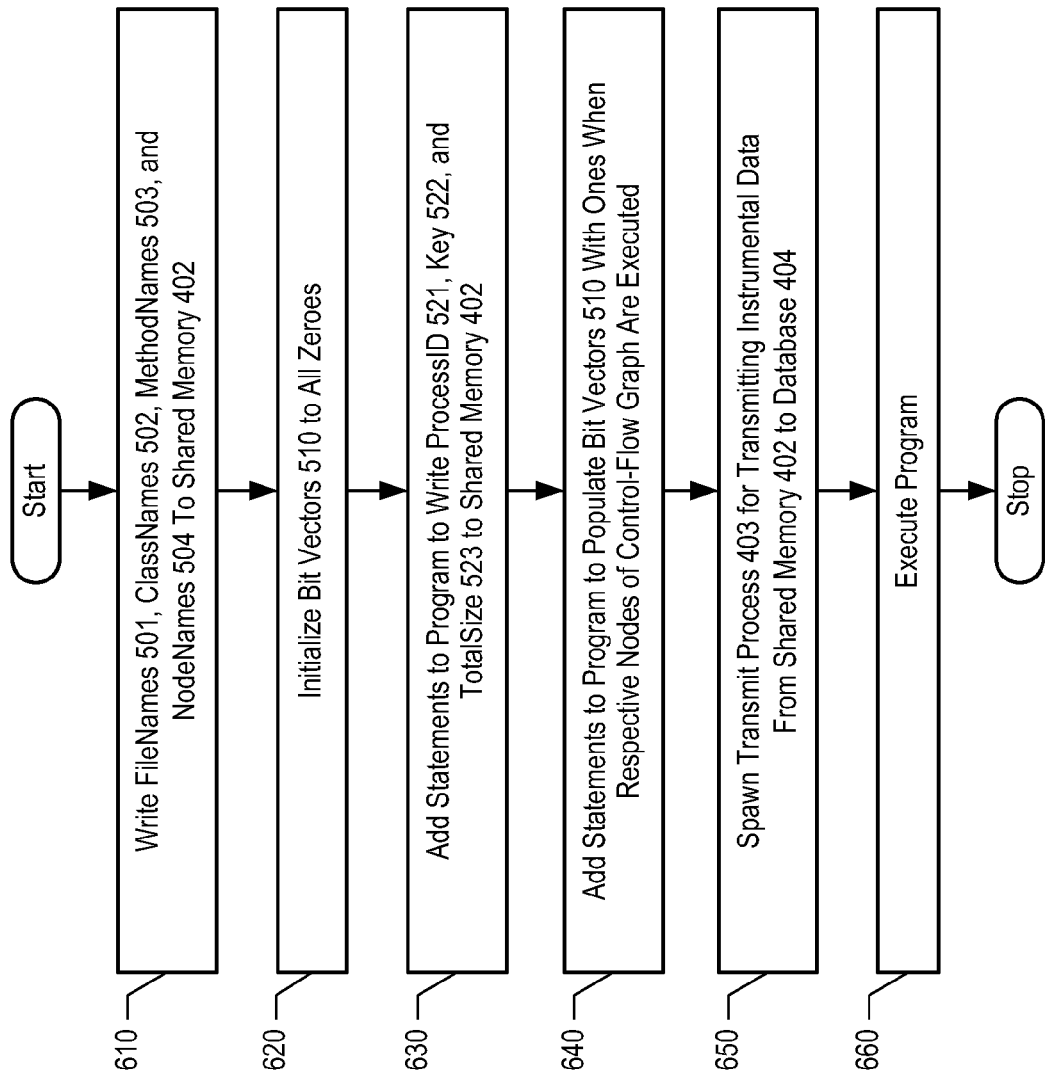
FIG. 6 depicts a flowchart of a method for monitoring the execution of an object-oriented program, in accordance with the illustrative embodiment of the present invention.

FIG. 6 depicts a flowchart of a method for monitoring the execution of an object-oriented program, in accordance with the illustrative embodiment of the present invention. It will be clear to those skilled in the art, after reading this disclosure, which tasks depicted in FIG. 6 can be performed simultaneously or in a different order than that depicted.

At task 610, FileNames 501, ClassNames 502, MethodNames 503, and NodeNames 504 for the object-oriented program under test are written to shared memory 402, in well-known fashion.

At task 620, bit vectors 510 are initialized to all zeroes.

At task 630, program statements are added to the object-oriented program to write ProcessID 521, Key 522, and TotalSize 523 to shared memory 402.

At task 640, program statements are added to the object-oriented program to populate bit vectors 510 with ones when respective nodes of the control-flow graph are executed.

At task 650, transmit process 403 is spawned for the transmission of instrumented data from shared memory 402 to database 404.

At task 660, the object-oriented program is executed. After task 660, the method of FIG. 6 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    storing, via a processor, a bit vector comprising N bits, wherein N is a positive integer, wherein each bit in the bit vector corresponds to a respective node of a control-flow graph of an object-oriented program into which a respective probe has been inserted, and wherein each bit in the bit vector is a flag that indicates a coverage of a respective node during an execution of the object-oriented program; and
    storing a character string comprising, for each function of the object-oriented program:
        a name of the function;
        a name of a class to which the function belongs;
        a name of a file where source code associated with the class is stored; and
        an identifier identifying nodes of the control-flow graph that belong to the function.

2. The method of claim 1, further comprising transmitting, via an independent software process running concurrently with the object-oriented program, the bit vector and the character string from memory to a database.

3. The method of claim 2, wherein the bit vector and the character string are transmitted via a user datagram protocol connection.

4. The method of claim 2, wherein the independent software process has a low priority.

5. The method of claim 1, further comprising instrumenting a plurality of nodes selected for instrumentation from the control-flow diagram of the object-oriented program, wherein instrumenting the plurality of nodes comprises inserting probes into N nodes determined by partitioning the object-oriented program into N blocks of code, wherein any consecutive lines of code X and Y are placed in a same block only if a first execution of X implies a second execution of both X and Y.

6. The method of claim 5, wherein partitioning the program is based on a partition of the plurality of nodes.

7. The method of claim 6, wherein partitioning the program further comprises:
    determining a non-empty subset S of the plurality of nodes;
    partitioning the control-flow diagram into subgraphs corresponding to child nodes of subset S; and
    determining a respective partition for each of the subgraphs.

8. The method of claim 7, wherein determining the non-empty subset S comprises solving a minimum-cut maximum-flow problem.

9. A data structure stored in a non-transitory computer-readable medium comprising:
    a bit vector comprising N bits, wherein N is a positive integer, wherein each bit in the bit vector corresponds to a respective node of a control-flow graph of an object-oriented program into which a respective probe has been inserted, and wherein each bit in the bit vector is a flag that indicates coverage of the respective node during an execution of the object-oriented program; and
    a character string comprising, for each function of the object-oriented program:
        a name of the function;
        a name of a class to which the function belongs;
        a name of a file where source code associated with the class is stored; and
        an identifier identifying nodes of the control-flow graph that belong to the function.

10. A system comprising:
    a processor; and
    a computer-readable storage medium having stored therein instructions which, when executed by the processor, cause the processor to perform a method comprising:
        storing a bit vector comprising N bits, wherein N is a positive integer, wherein each bit in the bit vector corresponds to a respective node of a control-flow graph of an object-oriented program into which a respective probe has been inserted, and wherein each bit in the bit vector is a flag that indicates a coverage of a respective node during an execution of the object-oriented program; and
        storing a character string comprising, for each function of the object-oriented program:
            a name of the function;
            a name of a class to which the function belongs;
            a name of a file where source code associated with the class is stored; and
            an identifier identifying nodes of the control-flow graph that belong to the function.

11. The system of claim 10, wherein the computer-readable storage medium further stores instructions which result in the method further comprising transmitting, via an independent software process running concurrently with the object-oriented program, the bit vector and the character string from the memory to a database.

12. The method of claim 11, wherein the bit vector and the character string are transmitted via a user datagram protocol connection.

13. The method of claim 12, wherein the independent software process has a low priority.

14. A non-transitory computer-readable storage medium having stored therein instructions which, when executed by a processor, cause the processor to perform a method comprising:
    storing, via a processor, a bit vector comprising N bits, wherein N is a positive integer, wherein each bit in the bit vector corresponds to a respective node of a control-flow graph of an object-oriented program into which a respective probe has been inserted, and wherein each bit in the bit vector is a flag that indicates a coverage of a respective node during an execution of the object-oriented program; and storing a character string comprising, for each function of the object-oriented program:
  a name of the function;
  a name of a class to which the function belongs;
  a name of a file where source code associated with the class is stored; and
  an identifier identifying nodes of the control-flow graph that belong to the function.

15. The non-transitory computer-readable storage medium of claim 14, wherein the non-transitory computer-readable storage medium further stores instructions which result in the method further comprising transmitting, via an independent software process running concurrently with the object-oriented program, the bit vector and the character string from the memory to a database.

16. The non-transitory computer-readable storage medium of claim 15, wherein the bit vector and the character string are transmitted via a user datagram protocol connection.

17. The non-transitory computer-readable storage medium of claim 16, wherein the independent software process has a low priority.

* * * * *